(12) United States Patent
Dumond

(10) Patent No.: US 10,272,659 B2
(45) Date of Patent: Apr. 30, 2019

(54) MULTI-COLORED DECORATIVE LAMINATE

(71) Applicant: Robert A. Dumond, Lewiston, ME (US)

(72) Inventor: Robert A. Dumond, Lewiston, ME (US)

(73) Assignee: Panolam Industries International, Inc., Shelton, CT (US)

( * ) Notice: Subject to any disclaimer, the term of this patent is extended or adjusted under 35 U.S.C. 154(b) by 314 days.

(21) Appl. No.: 13/735,698

(22) Filed: Jan. 7, 2013

(65) Prior Publication Data

US 2013/0276976 A1 Oct. 24, 2013

Related U.S. Application Data

(63) Continuation of application No. 11/741,266, filed on Apr. 27, 2007, now abandoned.

(51) Int. Cl.
*B32B 37/00* (2006.01)
*B32B 37/14* (2006.01)
*B32B 27/08* (2006.01)

(52) U.S. Cl.
CPC .............. *B32B 37/14* (2013.01); *B32B 27/08* (2013.01); *Y10T 428/249998* (2015.04)

(58) Field of Classification Search
CPC ... Y10S 428/913; Y10S 273/24; B32B 27/04; B32B 2307/422; B32B 37/00; B32B 38/08; B32B 38/14; B32B 37/14; B32B 37/16; B32B 38/145; B32B 2260/023; B32B 2307/4023; B32B 2307/4026; B32B 2307/404; B29C 66/721; B29C 66/733; B29C 66/7332; B29C 66/73321; B29C 66/73322
USPC ................. 156/67, 307.4, 277, 307.1–307.7; 428/690; 273/DIG. 24
See application file for complete search history.

(56) References Cited

U.S. PATENT DOCUMENTS

| | | | |
|---|---|---|---|
| 2,277,169 A | 3/1942 | Switzer | |
| 3,011,978 A | 12/1961 | Gosnell et al. | |
| 3,058,003 A | 10/1962 | Michlin | |
| 3,291,668 A | 12/1966 | Goldstein | |
| 3,418,189 A | 12/1968 | Grosheim | |

(Continued)

FOREIGN PATENT DOCUMENTS

| EP | 395496 | 10/1990 |
|---|---|---|
| FR | 2122566 | 9/1972 |

(Continued)

*Primary Examiner* — John L Goff, II
(74) *Attorney, Agent, or Firm* — O'Shea Getz P.C.

(57) ABSTRACT

A decorative laminate, and method for making the same, includes a core layer, a print layer, an overlay layer, and a luminescent layer. The print layer includes patterns printed thereon using conventional ink. In some embodiments, the overlay layer is impregnated with a resin that includes photoluminescent material of a single color which, when exposed to UV light, causes the single color to be visible throughout. The luminescent layer includes patterns of photoluminescent materials of different colors. In the embodiments where the overlay layer includes a resin with a photoluminescent material, the different colored patterns of the luminescent layer are simultaneously visible with the single color of the overlay layer when exposed to UV light.

6 Claims, 3 Drawing Sheets

(56) References Cited

U.S. PATENT DOCUMENTS

| | | |
|---|---|---|
| 3,767,517 A | 10/1973 | Williams |
| 3,949,133 A * | 4/1976 | Santurri ............... B44C 5/0469 |
| | | 427/326 |
| 4,029,467 A | 6/1977 | Defago et al. |
| 4,035,652 A | 7/1977 | Schroeder |
| 4,089,995 A | 5/1978 | Ferro et al. |
| 4,116,918 A | 9/1978 | Gattner et al. |
| 4,140,837 A * | 2/1979 | Drees ....................... B05D 5/10 |
| | | 428/503 |
| 4,311,748 A | 1/1982 | Casey et al. |
| 4,311,757 A | 1/1982 | Raghava et al. |
| 4,337,290 A * | 6/1982 | Kelly ........................ A63D 1/04 |
| | | 428/201 |
| 4,374,886 A | 2/1983 | Raghava |
| 4,473,613 A | 9/1984 | Jaisle et al. |
| 4,563,580 A | 1/1986 | Ishizuka et al. |
| 4,623,579 A | 11/1986 | Quon |
| 4,627,997 A | 12/1986 | Ide |
| 4,652,464 A | 3/1987 | Ludlum et al. |
| 4,741,968 A | 5/1988 | Dion et al. |
| 4,915,982 A | 4/1990 | Lindmayer |
| 5,489,241 A | 2/1996 | Perrier |
| 5,529,541 A | 6/1996 | Perrier |
| 5,775,016 A | 7/1998 | Chien |
| 5,888,142 A | 3/1999 | Perrier |
| 6,395,408 B1 | 5/2002 | Nelson et al. |
| 6,596,416 B2 | 6/2003 | Nelson et al. |
| 2002/0127430 A1 | 9/2002 | Nelson et al. |
| 2003/0203211 A1 | 10/2003 | Wei et al. |
| 2007/0207296 A1* | 9/2007 | Eisermann ............. B32B 27/04 |
| | | 428/200 |
| 2008/0044677 A1* | 2/2008 | Dumond ................ B32B 27/04 |
| | | 428/530 |

FOREIGN PATENT DOCUMENTS

| | | |
|---|---|---|
| GB | 2300596 | 11/1996 |
| JP | 273326 | 6/1990 |
| JP | 4187433 | 7/1992 |
| JP | 200043224 | 2/2000 |
| WO | 97025212 | 7/1997 |

* cited by examiner

MULTI-COLORED DECORATIVE LAMINATE

This application is a continuation of U.S. patent application Ser. No. 11/741,266 filed Apr. 27, 2007, now abandoned which is related to U.S. patent application Ser. No. 11/504,266 filed on Aug. 15, 2006 now abandoned.

BACKGROUND OF THE INVENTION

Field of the Invention

This invention relates generally to decorative laminates. More particularly, this invention relates to decorative laminates incorporating a plurality of printed patterns of different colors which are visibly luminescent simultaneously upon exposure to ultraviolet light, and to methods of producing the same.

Background Information

Decorative laminates typically include a core layer and a decorative layer. The core layer in general is a supporting layer onto which the decorative layer is bonded. In typical high heat and pressure laminates, the core layer comprises a plurality of cellulosic sheets made from a kraft paper impregnated with a laminating resin. Such laminating resins may include, for example, phenolic, melamine, amino, epoxy, polyester, silicone, and diallyl phthalate. A preferred laminating resin for the core layer is a phenolic resin made from the reaction of phenols with formaldehyde.

The decorative layer is typically formed from one or more sheets of cellulose pigmented paper containing a printed image, pattern, grain design or a solid color, which oftentimes has been impregnated with a transparent resin. Such resins may include, for example, melamine, amino, epoxy, polyester, silicone, and diallyl phthalate. A preferred resin for the decorative layer papers is melamine-formaldehyde which, when cured, is colorless, resistant to light and heat, and resistant to a variety of solvents and stains. The decorative layer may also be "dry"—that is, lacking any impregnating resin. The printed image is something that can be seen in normal light; i.e., when the decorative layer is subjected to visible light (the portion of the electromagnetic spectrum that is visible to the human eye; e.g., about 400-700 nm) the printed image can be seen by the human eye.

When the decorative layer includes a printed pattern and is used in certain applications (e.g., bowling lanes), it is commonly covered with an overlay layer, which is typically a high-quality alpha cellulose paper impregnated with a melamine-formaldehyde resin. The overlay layer helps to protect the decorative layer from external abuse such as impact from objects, abrasive wear and tear, harsh chemicals, burns, spills and the like. The melamine-formaldehyde resin primarily accounts for these protective properties of the laminate. The alpha-cellulose paper: 1) acts as a translucent carrier for the water-thin resin; 2) imparts strength to the melamine-formaldehyde resin; 3) maintains a uniform resin thickness in the overlay layer by acting as a shim; and 4) controls resin flow.

The core layer, the decorative layer and, when utilized, the overlay layer, are typically stacked in a superimposed relationship, between steel press plates and subjected to elevated pressure and temperature for a time sufficient to cure the laminating resins impregnating the respective layers. The elevated temperature and pressure cause the impregnated resins to flow, which consolidates the stack into an integral mass that is the laminate. These laminates can be used in numerous applications, including bowling lanes, floors, counter tops, table tops, furniture, store fixtures, and the like.

Examples of conventional high pressure decorative laminates are disclosed in U.S. Pat. Nos. 3,418,189; 4,311,748; 4,473,613; and 4,741,968.

It is also known to provide a decorative laminate with an image or pattern printed on one or more of the sheets comprising the laminate using a photoluminescent material. When exposed to ultraviolet light, the image or pattern visibly luminesces. See for example, U.S. Pat. Nos. 6,596,416 and 6,395,408, which are hereby incorporated by reference. Disclosed therein is a single image or pattern of a single color. When such a decorative laminate is used, for example, in bowling lane applications, the single color image or pattern limits the applications for which the laminate can be used. Further it is known to utilize aluminum oxide within the overlay layer to contribute to its wear-resistant qualities. However, the aluminum oxide tends to cause undesirable scuffing and wear to the bowling ball and to the soles of the shoes worn by the bowler. What is needed is a decorative laminate for use in, for example, bowling lanes, where a plurality of printed images or patterns, made from photoluminescent materials of different colors, are visibly luminescent simultaneously when exposed to ultraviolet light, against a backdrop of a single color that is also visibly luminescent simultaneously when exposed to ultraviolet light, thereby providing a relatively greater amount of visual information to the bowler to add to the safety and enjoyment of the bowling experience. What is also needed is an overlay layer less apt to scuff and wear items in contact with the laminate; e.g., bowling balls, bowling shoes, etc.

SUMMARY OF THE INVENTION

According to a preferred embodiment of the present invention, a decorative laminate comprises a core layer, a print layer, a high-wear overlay layer, a luminescent layer, and a clear overlay layer. The core layer includes one or more resin impregnated paper sheets. The print layer includes a dry paper sheet with a plurality of patterns printed thereon using conventional ink visible under normal light. The high-wear overlay layer includes a single sheet of resin impregnated paper. The resin includes a photoluminescent material of a single color that, when exposed to ultraviolet light, causes the single color to be visible throughout this overlay layer. The luminescent layer includes a dry paper sheet having a plurality of patterns printed thereon using different color photoluminescent materials, which are each also of a different color than the single color of the high-wear overlay layer. The patterns of different colors are simultaneously visible with each other and with the single color of the high-wear overlay layer when exposed to ultraviolet light such that the different colors in the luminescent layer block from view the single color of the high-wear overlay layer in the areas of the patterns in the overlay layer. The blocking occurs because the photoluminescent material patterns within the luminescent layer absorb the ultraviolet light and prevent the ultraviolet light from reaching the photoluminescent material of the high-wear overlay layer. In the absence of ultraviolet light, the photoluminescent material of the overlay layer will not luminesce; hence, it is "blocked". The clear overlay layer includes one or more resin impregnated paper sheets. All of the layers may be stacked together and laminated under heat and pressure to form the decorative laminate.

In some embodiments, an additional print layer may be disposed on an opposite side of the core layer, followed by an additional high-wear overlay layer next to the additional print layer, followed by an additional clear overlay layer. These additional layers allow for a more balanced construction of the overall decorative laminate, thereby helping to resist warping and allowing the laminate to remain flat over time.

In an alternative embodiment of the present invention, a decorative laminate comprises a core layer, a decorative layer, a high-wear overlay layer, and a clear overlay layer. The core layer includes one or more resin impregnated paper sheets. The decorative layer includes a dry paper sheet with a plurality of patterns printed thereon with photoluminescent material of different colors, where the resulting patterns of different colors are simultaneously visible when exposed to ultraviolet light. The high-wear overlay layer includes a single sheet of resin impregnated paper. The clear overlay layer includes one or more resin impregnated paper sheets. The layers may be stacked together and laminated under heat and pressure to form the decorative laminate.

As indicated above, an additional decorative layer may be disposed on an opposite side of the core layer, followed by an additional high-wear overlay layer next to the additional decorative layer, followed by an additional clear overlay layer. These additional layers allow for a more balanced construction of the decorative laminate, thereby helping to resist warping and allowing the laminate to remain flat over time.

In some embodiments, the core layer may be replaced by a substrate and the remaining layers laminated in a low pressure process or thermofused to the substrate.

These and other features and advantages of the present invention will become apparent in light of the drawings and detailed description of the present invention provided below.

DETAILED DESCRIPTION OF THE INVENTION

The invention relates to decorative laminates which incorporate a photoluminescent material. The term "photoluminescent" as used herein denotes a material which is either visibly phosphorescent (i.e., where there is a continued luminescence after termination of the exciting ultraviolet radiation), or visibly fluorescent (i.e., where the luminescence ceases as soon as the exciting ultraviolet radiation is removed).

Figure 1:
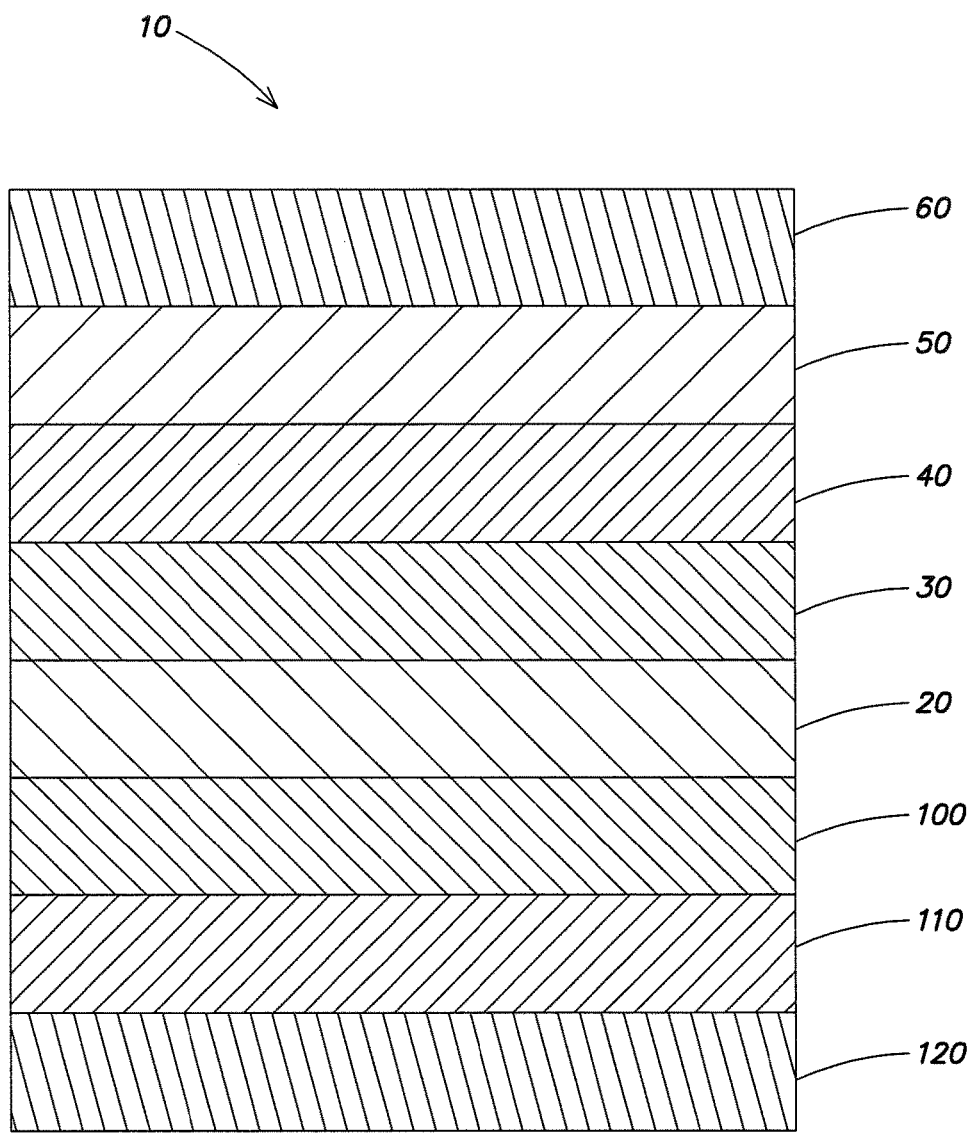
FIG. 1 is a cross-sectional view (not to scale) of the stacked layers of a decorative laminate according to a first embodiment of the present invention.

Referring to FIG. 1, in a first embodiment of the invention the decorative laminate 10 comprises a core layer 20, a print layer 30, a high-wear overlay layer 40, a luminescent layer 50, and a clear overlay layer 60. The core layer 20 comprises one or more cellulosic sheets (e.g., kraft paper) impregnated with a laminating resin. Acceptable laminating resins for the core layer 20 include phenolic, melamine, amino, epoxy, polyester, silicone, and diallyl phthalate resins. A phenolic resin made from the reaction of phenols with formaldehyde is a more specific example of an acceptable laminating resin.

The print layer 30 is disposed next to the core layer 20. The print layer 30 typically includes at least one single cellulosic sheet (e.g., alpha cellulose paper) that is "dry" in that no resins are impregnated in this layer. A plurality of patterns is printed on the dry paper sheet with conventional ink visible under normal light and not under ultraviolet light. The patterns may be printed using conventional methods, such as screen printing, gravure printing, digital printing or the like. For bowling lane applications (FIG. 2), the patterns may comprise one or more foul lines 62, a straight line row of dots 64, and a staggered row of darts 66. The dots and darts assist the bowler in guiding the ball down the lane while also providing the bowler with safety information. Also, the print layer 30 may have a wood grain design.

The high-wear overlay layer 40 is disposed next to the print layer 30. The high-wear overlay layer 40 includes at least one sheet of resin impregnated paper. Melamine resin is an acceptable resin for impregnating the overlay layer 40. An acceptable basis weight for the overlay layer paper is about 28 lbs. The basis weights given for the overlay layer 40 and other layers below represent acceptable basis weights that may vary depending upon the laminate application at hand. Aluminum oxide may be added to the paper to increase the wear resistance of the high-wear overlay layer 40. The impregnating resin includes a photoluminescent material of a single color that, when exposed to ultraviolet light, causes the single color to be visible throughout this overlay layer 40. As described in more detail hereinafter, the single color essentially comprises a backdrop against which patterns (e.g., foul lines 62, dots 64, darts 66) of different colors can be seen under ultraviolet light. An acceptable photoluminescent material for the single color is Leucophor BCR™, available from Clariant Corp. of Charlotte, N.C. Leucophor BCR™ is a stilbene fluorescent material supplied as a liquid having about 49% solids and which generates a blue color upon luminescence.

The luminescent layer 50 is disposed next to the high-wear overlay layer 40. The luminescent layer 50 may include a dry paper sheet having a basis weight of about 13.5 lbs. The paper sheet of the luminescent layer 50 includes at least one pattern of luminescent material. Some embodiments include a plurality of patterns of different photoluminescent materials to create different color patterns. Patterns are typically printed onto the luminescent layer, although other application methods may be used alternatively. For bowling lane applications, the colors of the decorative luminescent layer 50 are preferably different than the single photoluminescent color (e.g., blue) of the high-wear overlay layer 40. The color patterns may be printed in the luminescent layer 50 using any known printing method, such as screen printing, gravure printing, digital printing or the like. The luminescent patterns may include different colors depending upon the application for the decorative laminate 10. For bowling lane applications, the patterns may comprise the same patterns (FIG. 2) as those printed on the print layer 30; that is, one or more foul lines 62, a straight line row of dots 64, and a staggered row of darts 66. Typically, as mentioned above, patterns such as foul lines 62, dots 64 and darts 66 are printed on the print layer 30 using conventional inks that are visible only under normal light and not under ultraviolet light. The bowling lane beyond the traditional foul lines 62 typically is oiled, making it relatively slippery and thus possible for a bowler to slip and fall if the bowler travels beyond the foul lines.

Figure 2:
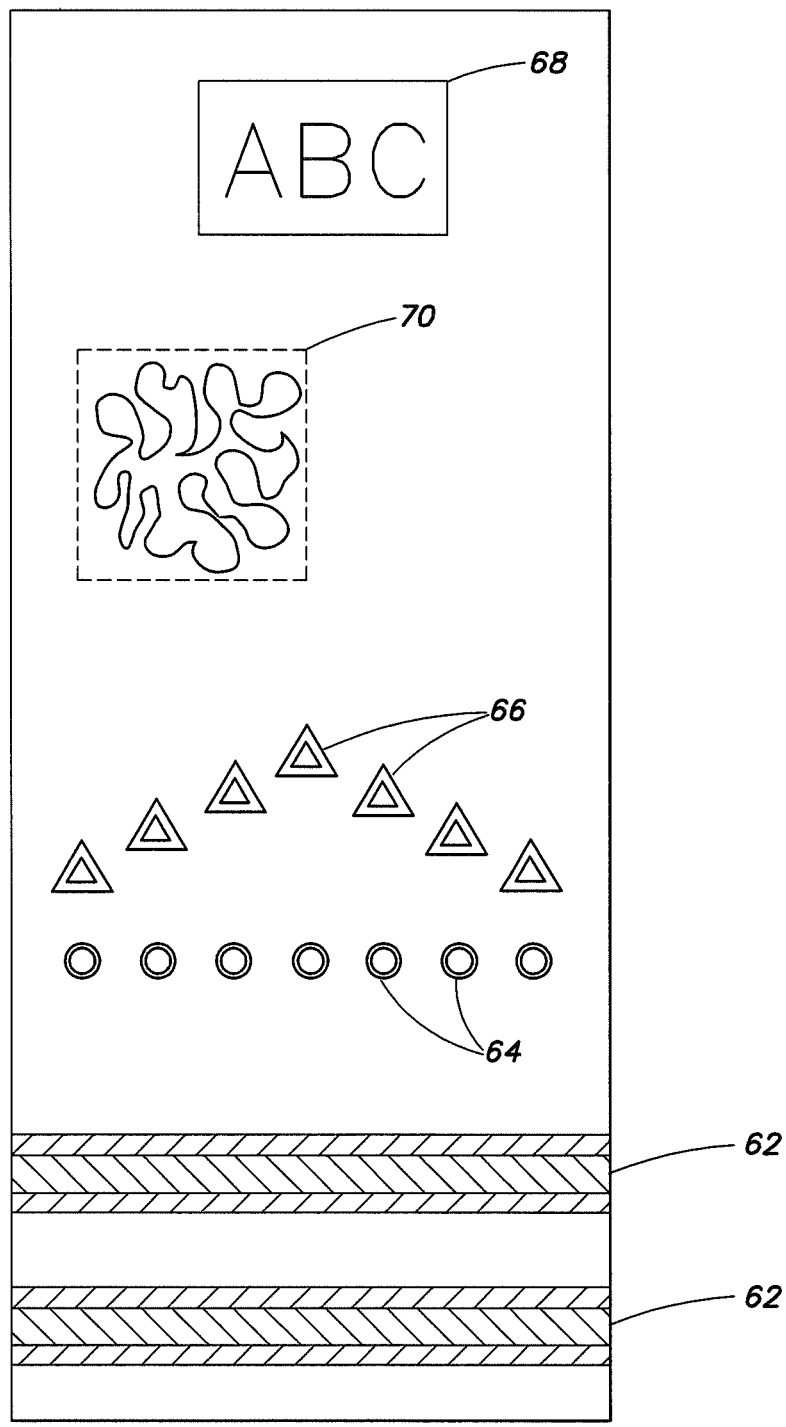
FIG. 2 is a top view of the decorative laminate of FIG. 1 illustrating the various patterns formed in the laminate which is used, for example, in a bowling lane application.

In accordance with this embodiment of the invention, a second set of foul lines 62, dots 64 and darts 66 is printed on the luminescent layer 50 using the different colored photoluminescent materials. Preferably, these photoluminescent patterns are printed on the luminescent layer 50 such that they outline (i.e., are disposed over) the foul lines 62, dots 64 and darts 66 printed on the print layer 30. In particular, each of the patterns in the luminescent layer 50 may be sized slightly larger (e.g., one-eighth of an inch larger) than the corresponding patterns in the print layer 30. FIG. 2 illustrates this larger "outlining" feature of the foul lines 62, dots 64 and darts 66 in a somewhat exaggerated manner. Additional design graphics such as, for example, a logo 68, swirled lines 70 (e.g., a "boomerang pattern") and the like, which are visible only under ultraviolet light, may also be printed on the luminescent layer 50 using the photoluminescent materials to enhance the bowling experience. As illustrated in FIG. 2, the swirled lines 70 occupy only a portion of the luminescent layer 50. However, this is purely exemplary; the swirled lines 70 may, if desired, occupy the entire luminescent layer 50. The photoluminescent patterns in the luminescent layer 50 are preferably of different colors to assist in providing safety information to the bowler and to enhance the bowling experience, and are generally invisible under normal light. The resulting patterns of different colors are simultaneously visible with each other and with the single color of the high-wear overlay layer 40 for the most part only when exposed to ultraviolet light. In particular, under ultraviolet light, the different colors in the luminescent layer 50 block out from view the single color of the high-wear overlay layer 40 in the areas of the patterns 62, 64, 66 in the luminescent layer 50. Thus, in an exemplary embodiment, the patterns 62-70 may be visibly defined under ultraviolet light as comprising various colors (e.g., yellow, red, green)—all against a backdrop of a blue color for the remainder of the bowling lane. Other color schemes for the patterns and the backdrop are possible, as should be apparent to one of ordinary skill in the art in light of the teachings herein.

The photoluminescent materials within the patterns 62-70 may be dispersed in a suitable vehicle which offers the flow characteristics desired for the selected printing method. The photoluminescent materials are provided in an amount which causes the printed patterns 62-70 to visibly luminesce in the decorative luminescent layer 50. Selection of a particular ultraviolet light sensitive dye or pigment will typically depend upon the desired color to be generated when the particular pattern luminesces in the presence of ultraviolet light. In addition, the selected photoluminescent dyes or pigments in general must be able to withstand the heat and pressure to which the layers are exposed during the lamination process. An acceptable photoluminescent material is the aforementioned Leucophor BCR™, which generates a blue color upon fluorescence. Other acceptable photoluminescent materials include AIT4466 (yellow upon fluorescence) from Dayglo Color Corp. of Cleveland, Ohio; Uvitex NFW Liquid, (blue upon fluorescence) from CIBA Specialty Chemicals of Mobile, Ala.; Fluorescent Brightener 0556 (blue upon fluorescence) from Chromatech Inc. of Canton, Mich.; Phosphorescent Orange P500480 (orange upon phosphorescence) from USR Optonix, Inc. of Washington, N.J.; Phosphorescent MBW Green, 2330 (green upon phosphorescence) from USR Optonix, Inc.; Phosphorescent LBY Green 2330 (green upon phosphorescence) from USR Optonix, Inc.; 2210 (green upon fluorescence) from USR Optonix, Inc.; 3336 (yellow/orange upon fluorescence) from USR Optonix, Inc.; YS-A-Red (red upon fluorescence) from United Mineral and Chemical Corp. of Lyndhurst, N.J.; GBF Orange (orange upon fluorescence) from United Mineral and Chemical Corp.; and GBF Green (green upon fluorescence) from United Mineral and Chemical Corp. Other photoluminescent materials may be utilized, as should be apparent to one of ordinary skill in the art in light of the teachings herein, such that a particular pattern 62-70 may be visibly luminescent (either by phosphorescence or fluorescence) at a certain color when exposed to ultraviolet light.

The photoluminescent pigment or dye may be combined with conventional printing inks with which the selected photoluminescent pigment or dye is compatible and can be readily dispersed. For example, the photoluminescent pigment or dye may be combined with a Clear Screen Print Extender™, commercially available from Gotham Ink of Marlboro, Mass., or NAZDAR Clear 2700 AquaSafe Gloss Screen Ink 2727 Overprint Clear, from NAZDAR of Shawnee, Kans. As will be appreciated by those skilled in the art, the printing composition may also include suitable amounts of other additives, such as viscosity modifiers, heat stabilizers, wetting agents, binders or the like. Generally, when the patterns 62-70 are printed onto the paper sheet of the decorative luminescent layer 50 using a known screen printing technique, each pattern or all patterns of one color are printed separately, one at a time, in the overall printing process.

Still referring to FIG. 1, the clear overlay layer 60 is disposed next to the luminescent layer 50. The clear overlay layer 60 comprises one or more sheets of cellulosic paper impregnated with a suitable transparent resin, such as melamine-formaldehyde. High-quality alpha cellulose paper having a basis weight of about 22 lbs. is acceptable for the clear overlay layer 60. The clear overlay layer 60 helps to protect the underlying luminescent layer 50, and is therefore desirable in applications such as bowling lanes.

In forming the decorative laminate 10 of this embodiment of the present invention, the core layer 20, the print layer 30, the high-wear overlay layer 40, the luminescent layer 50 and the clear overlay layer 60 are stacked in a superimposed relationship between steel press plates or the like. An additional print layer 100 may be disposed on the opposite surface of the core layer 20 (FIG. 1). Next to the additional print layer 100 may be disposed an additional high-wear overlay layer 110, followed by an additional clear overlay layer 120. The construction of these additional layers 100, 110, 120 may be similar to the corresponding layers 30, 40, 60 described hereinabove. The resulting decorative laminate 10 in this alternative is of a more balanced construction, thereby helping to resist warping and allowing the overall decorative laminate 10 to better remain flat over time. The stacked layers are subjected to a sufficient pressure and temperature, and for a time sufficiently long, to cure the laminating resins impregnating the respective layers. The laminating temperature is at least about 230° F., and is usually in the range of about 250° F. to about 300° F. The pressure is generally increased to between about 305 to 1500 psi. The elevated temperature and pressure cause the resins within each of the impregnated sheets of the layers to flow, which consolidates the stack into an integral mass that comprises the decorative laminate 10.

When the laminate is subjected to ultraviolet light (e.g., in the range of between about 200 nm to 400 nm), the light penetrates the clear overlay layer 60 and impinges upon the luminescent layer 50 and the high-wear overlay layer 40. As a result, the patterns 62-70 printed with photoluminescent materials on the luminescent layer 50 and the high-wear overlay layer 40 emit luminescent radiation such that the solid color in the high-wear overlay layer 40 and the printed patterns 62-70 in the luminescent layer 50 are visible. A reduced level of visible light impinging upon the decorative laminate 10 will likely enhance the visibility of the luminescent patterns.

In some embodiments, the print layer 30, the high-wear overlay layer 40, the luminescent layer 50 and the clear overlay layer 60 are prepared as discussed above, and are then incorporated into a low pressure laminate in which a rigid substrate (e.g., particle board, fiber board, etc.) replaces the core layer 20. The print layer 30 is stacked in a superimposed relationship with the substrate. Selected ones of the layers are impregnated with a resin in the same manner as for the high pressure laminate discussed above, although a higher catalyst level may be employed. The layers are placed in a hot press between steel press plates and subjected to a relatively low pressure and temperature for a time sufficiently long enough to cure the resins impregnating the respective layers.

Figure 3:
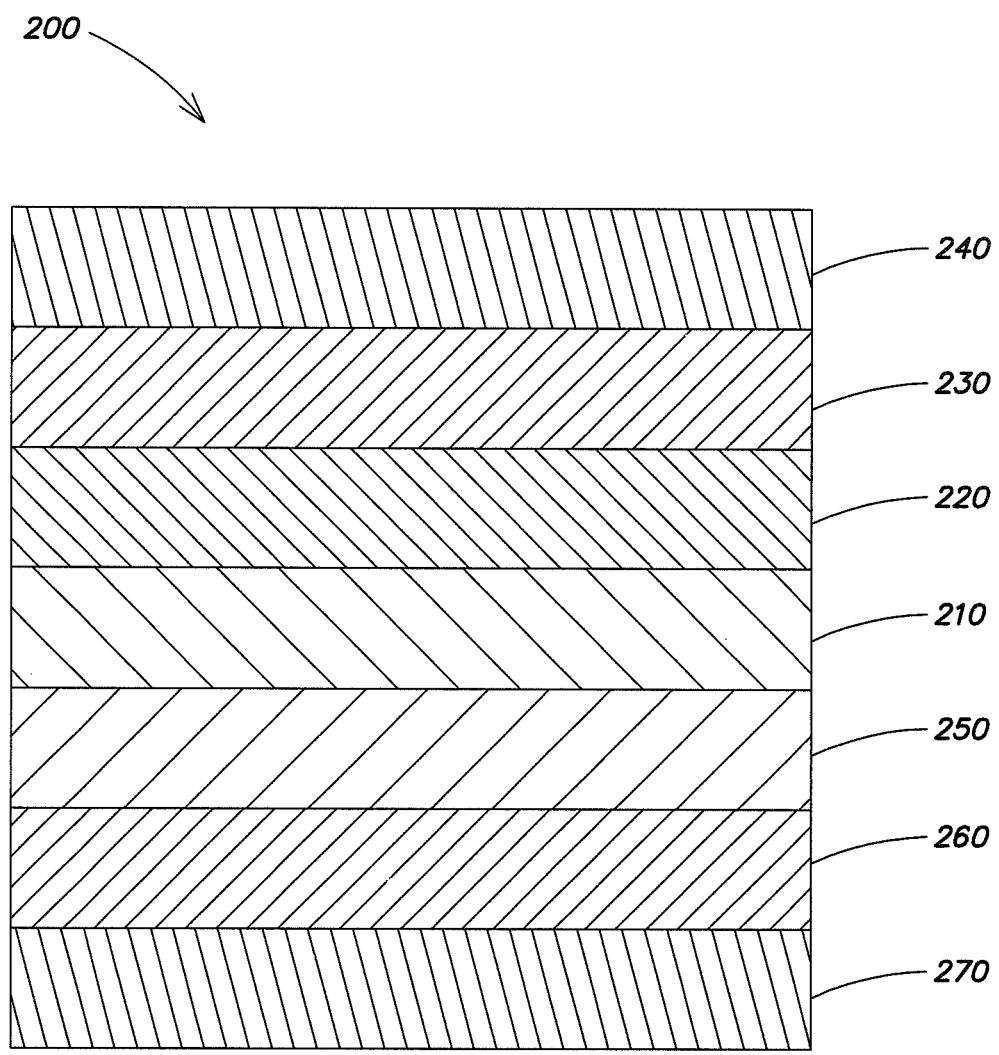
FIG. 3 is a cross-sectional view (not to scale) of the stacked layers of a decorative laminate according to a second embodiment of the present invention.

In a second embodiment of the present invention illustrated in FIG. 3, a decorative laminate 200 comprises a core layer 210 that is similar in construction to the core layer 20 of the decorative laminate 10 of FIG. 1. Disposed next to the core layer 210 is a decorative layer 220 that comprises one or more cellulosic sheets (e.g., alpha cellulose paper) which may include a wood grain design. A plurality of patterns similar to those illustrated in FIG. 2 (e.g., foul lines 62, dots 64, darts 66) is printed onto the cellulosic sheet(s) forming the decorative layer 220 using conventional inks that are visible under normal light. The photoluminescent patterns 62-70 are preferably of different colors to assist in providing safety information to the bowler and to enhance the bowling experience, and are generally invisible under normal light.

Next to the decorative layer 220 is disposed a high-wear overlay layer 230, which may be similar to the high-wear overlay layer 40 of the decorative laminate 10 of FIG. 1, with the exception that the high-wear overlay layer of this embodiment does not contain any photoluminescent material. As such, the high-wear overlay layer 230 of this embodiment does not luminesce at a single color when exposed to ultraviolet light. Next to the high-wear overlay layer 230 is disposed a clear overlay layer 240, which may be similar to the clear overlay layer 60 of the decorative laminate 10 of FIG. 1. In this embodiment of the present invention, the clear overlay layer 240 may be less wear-resistant than the high-wear overlay layer 230 and is utilized to protect objects that contact the laminate 200 (e.g., bowling balls and shoes) from excessive wear due to the aluminum oxide or other wear resistant particles. In some embodiments, an additional decorative layer 250, high-wear overlay layer 260, and clear overlay layer 270 may be disposed on the opposite side of the core layer 210, as shown in FIG. 3. The stacked layers are subjected to a sufficient pressure and temperature, and for a time sufficiently long, to cure the laminating resins impregnating the respective layers. The laminating temperature is at least about 230° F., and is usually in the range of about 250° F. to about 300° F. The pressure is generally increased to between about 305 to 1500 psi.

In some embodiments, the decorative layer 220, the high-wear overlay layer 230, and the clear overlay layer 240 are prepared as discussed above, and are incorporated into a low pressure laminate in which a rigid substrate (e.g., particle board, fiber board, etc.) replaces the core layer 210. The decorative layer 220 is stacked in a superimposed relationship with the substrate. As indicated above, a higher catalyst level may be employed with a low pressure laminate or thermofused laminate. The layers are placed in a hot press between steel press plates and subjected to a relatively low pressure and temperature for a time sufficiently long enough to cure the laminating resins impregnating the respective layers, as is conventional.

The following examples are illustrative of the present invention and do not constitute any limitation with regard to the subject matter of the invention.

Example 1

Referring to FIG. 1, the stack of layers that ultimately form a decorative laminate 10 includes a clear overlay layer 60, a luminescent layer 50, a high-wear overlay layer 40, a print layer 30, and a core layer 20. The clear overlay layer 60 includes a light basis weight melamine-formaldehyde impregnated overlay sheet. The luminescent layer 50 includes at least one light basis weight dry sheet with one or more different colored pigments screen printed onto the sheet. The high-wear overlay layer 40 includes a melamine-formaldehyde impregnated sheet that is also impregnated with Leucophor BCR™, which is a photoluminescent material that fluoresces blue in the presence of ultraviolet light. The core layer 20 includes a plurality of phenolic impregnated kraft paper sheets. The embodiment shown in FIG. 1 also includes a second print layer 100 (e.g., the same as print layer 30), a second high-wear overlay layer 110 (e.g., the same as overlay layer 40), and a second clear overlay layer 120 (e.g., the same as clear overlay layer 60).

The following colored pigments may be mixed in varying percentages together with Clear Screen Print Extender™, available from Gotham Ink of Marlboro, Mass. The pigments, which can be screen printed onto the decorative luminescent layer 50 to form the various patterns 62-70 (FIG. 2), include the following: Yellow AIT4466 pigment from Dayglo Color Corp. of Cleveland, Ohio; Blue Uvitex NFW Liquid from CIBA Specialty Chemicals of Mobile, Ala.; YS-A Red pigment from United Mineral and Chemical Corp. of Lyndhurst, N.J.; GBF Orange pigment from United Mineral and Chemical Corp.; and GBF Green pigment from United Mineral and Chemical Corp. The eight layers 20-60, 100-120 are positioned between steel press plates and subjected to about 1200 psi at a maximum temperature of about 300° F. for a total of about 20 minutes to form the decorative laminate 10.

Example 2

Now referring to FIG. 3, the stack of layers that ultimately form a laminate decorative panel 200 include an overlay layer 240, a high-wear overlay layer 230, a decorative layer 220, and a core layer 210. A light basis weight melamine-formaldehyde impregnated sheet comprises the overlay layer 240. A sheet impregnated with melamine-formaldehyde resin having abrasion resistant particles comprises the high-wear overlay layer 230. A sheet with screen printed images in various colors comprises the decorative layer 220. A plurality of phenolic impregnated kraft paper sheets comprises the core layer 210. The embodiment shown in FIG. 3 also includes a high-wear overlay layer 260 (e.g., the same as high-wear overlay layer 230) and an overlay sheet 270 (e.g., the same as overlay layer 240).

The following colored pigments may be mixed in varying percentages together with Clear Screen Print Extender™, available from Gotham Ink of Marlboro, Mass. The pigments, which can be screen printed onto the decorative layer 220 to form the various patterns 62-70 (FIG. 2) include the following: Yellow AIT4466 pigment from Dayglo Color Corp. of Cleveland, Ohio; Blue Uvitex NFW Liquid from CIBA Specialty Chemicals of Mobile, Ala.; YS-A Red pigment from United Mineral and Chemical Corp. of Lyndhurst, N.J.; GBF Orange pigment from United Mineral and Chemical Corp.; and GBF Green pigment from United Mineral and Chemical Corp. The eight layers are positioned between steel press plates and subjected to about 1200 psi at a maximum temperature of about 300° F. for a total of about 20 minutes to form the laminate 200.

What is claimed is:

1. A method of forming a heat and pressure consolidated decorative laminate, comprising the steps of:
   stacking a plurality of layers, which stack includes in order a core layer having one or more core layer sheets, each core layer sheet at least partially impregnated with a resin, a print layer having one or more cellulosic sheets, each of which print layer sheets is resin-free, and at least one of which print layer sheets includes at least one pattern printed thereon that is visible under normal light, a first overlay layer having one or more cellulosic sheets, each first overlay layer sheet having a first basis weight and each sheet impregnated with a resin that includes a first photoluminescent material that is visible as a single first color under ultraviolet light, and a luminescent layer of a cellulosic resin-free sheet having a second basis weight, which second basis weight is less than the first basis weight, with at least one pattern of a second photoluminescent material that is visible as one or more second colors under ultraviolet light, wherein the one or more second colors are different than the first color; and
   subjecting the stack to a sufficiently high temperature and pressure for a period of time that the resins cure and bond the layers into the decorative laminate.

2. The method of claim 1, where an entirety of the first overlay layer luminesces at the first color under ultraviolet light.

3. The method of claim 2, wherein at least a portion of the first overlay layer is obstructed from view by the at least one pattern of the luminescent layer under ultraviolet light.

4. The method of claim 1, where the first photoluminescent material is from a group consisting of a phosphorescent material and a fluorescent material.

5. The method of claim 1, where the second photoluminescent material is from a group consisting of a phosphorescent material and a fluorescent material.

6. A method of forming a heat and pressure consolidated decorative laminate, comprising the steps of:
   providing a stack including a substrate and a plurality of layers, including a print layer having one or more cellulosic sheets, each of which print layer sheets is resin-free, and at least one of which print layer sheets includes at least one pattern printed thereon that is visible under normal light, a first overlay layer having one or more cellulosic sheets, each first overlay layer sheet having a first basis weight and each sheet impregnated with a resin that includes a first photoluminescent material that is visible as a single first color under ultraviolet light, and a luminescent layer of a cellulosic resin-free sheet having a second basis weight, which second basis weight is less than the first basis weight, with at least one pattern of a second photoluminescent material that is visible as one or more second colors under ultraviolet light, wherein the one or more second colors are different than the first color; and
   subjecting the stack to a sufficiently high temperature and pressure for a period of time that the resin cures and bonds the layers and substrate into the decorative laminate.

* * * * *